Nov. 20, 1934.  E. L. RAGONNET  1,981,372
TRACER DEVICE
Filed March 17, 1930  2 Sheets-Sheet 1
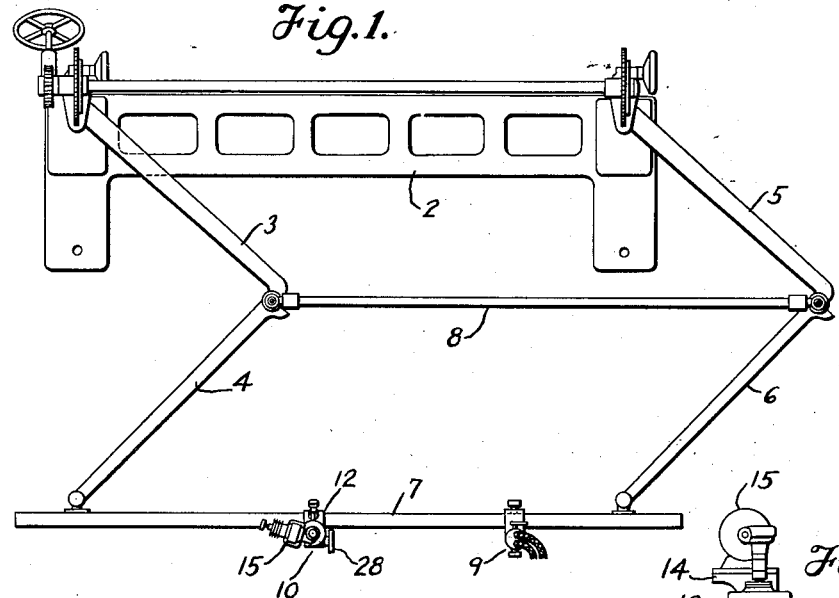
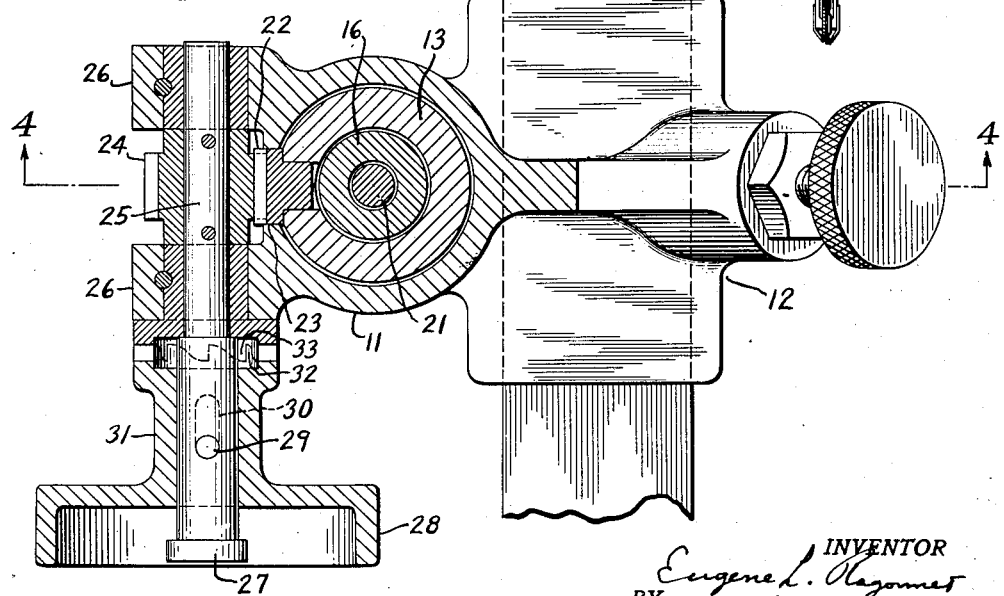
INVENTOR
Eugene L. Ragonnet
BY
ATTORNEY Nov. 20, 1934.　　　E. L. RAGONNET　　　1,981,372
TRACER DEVICE
Filed March 17, 1930　　2 Sheets-Sheet 2
Fig. 4.
Fig. 5.
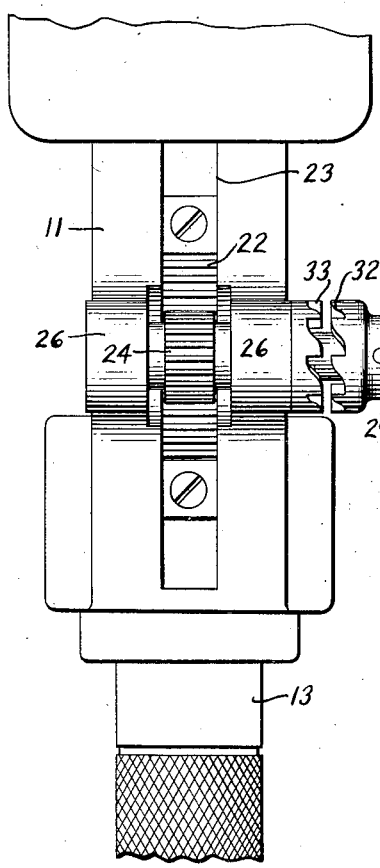
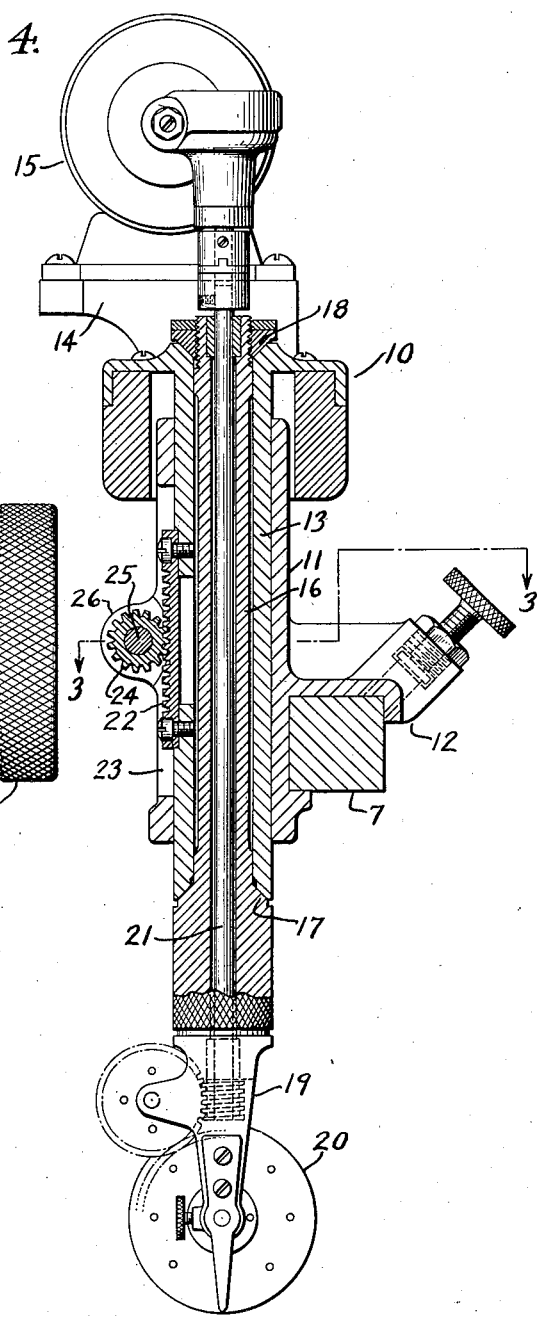
INVENTOR
Eugene L. Ragonnet
BY
ATTORNEY Patented Nov. 20, 1934

1,981,372

UNITED STATES PATENT OFFICE 1,981,372

TRACER DEVICE

Eugene L. Ragonnet, New York, N. Y., assignor to Air Reduction Company, Incorporated, New York, N. Y., a corporation of New York Application March 17, 1930, Serial No. 436,554

4 Claims. (Cl. 33—23)

The invention relates to welding and cutting apparatus, and more particularly to that class of machines in which a torch or other instrumentality is carried by a jointed frame or some equivalent thereof which enables the torch to have universal movement in a plane. A driven tracer connected with the frame or its equivalent and adapted to roll over a drawing or template causes the torch to move at uniform speed in any and changing directions in accordance with the design. Illustrations of such machines are disclosed in the Bucknam Patents 1,059,329 and 1,104,289, and various other forms of frames and mechanisms for supporting the torch while enabling it to be moved in all directions are known. Various forms of tracers are also known, that shown in the accompanying drawings being illustrative.

The subject of this invention is a simple and convenient device, designed for one-hand operation, by means of which the tracer can be quickly lifted and caused to be sustained in mid-air on the universally movable support, in order that the support may be moved about freely to position the tracer and torch where desired within the working area covered by the machine. The same device enables the tracer to be quickly and safely lowered into contact with a drawing or template.

The accompanying drawings show the preferred embodiment of the invention and illustrate one of the possible forms of frame or universal movement structure to which the tracer may be applied.

Fig. 1 is a plan view of such a machine.

Fig. 2 is a fragmentary side elevation on a larger scale, a bar of the frame being in section.

Fig. 3 is a horizontal section on a still larger scale taken through the tracer on the line 3—3 of Fig. 4.

Fig. 4 is a sectional elevation taken on the line 4—4 of Fig. 3.

Fig. 5 is a fragmentary elevation looking at right angles to Fig. 4.

The machine chosen for illustration has a base 2, and two pairs of swinging jointed arms 3, 4 and 5, 6, connected by a front bar 7 and an intermediate bar 8. The torch 9 and the tracer 10 mounted on or connected with the front bar are movable in all directions parallel with a plane, the torch being compelled to move in accordance with the movement of the tracer. As previously indicated, any form of frame or device having such capabilities may be employed.

The tracer illustrated is of the type disclosed in the Bucknam patents aforesaid and in the Ragonnet Patent 1,735,129, but the invention is not limited to the specific form of the tracer.

A vertical tubular bearing 11 for the tracer is applied to the bar 7. This bearing or guide can be secured to the bar at any point along its length by means of a screw-clamp fitting 12, and the torch is also positionable at any desired point on the bar.

A part in the form of a sleeve 13 extends through the bearing 11, and is freely movable vertically in the bearing relatively to the universally movable frame. Rotation of this part relatively to the frame is prevented, or at least limited, by means which will be described.

Supported on the upper portion of the part 13 there is a platform 14 which carries an electric motor 15.

A hollow swivel stem 16 passes through the interior of the sleeve 13, in which it turns freely. A shoulder 17 on the lower portion of this stem bearing against the lower end of the sleeve 13, and a nut 18 on the upper end of the stem bearing against the upper end of the sleeve, keep the stem from moving vertically in the sleeve and compel it to partake of vertical movement therewith.

The lower end of the swivel stem 13 is provided with a fork 19, in which is journaled a tracer wheel 20.

A driving shaft 21 passes through the swiveled member 16, this shaft being geared at its upper end to the motor 15 and at its lower end to the rolling element 20.

The matters described thus far are not new. The present invention relates more particularly to a novel plan of means for raising and sustaining the tracer, either for the purpose of stopping the movement of the frame and the torch, or in order that the frame may be moved by hand with the tracer raised clear of underlying surfaces or obstructions, the latter being a very desirable feature. The preferred embodiment of such means will now be described.

A toothed rack 22 is secured to the side of the sleeve 13. This rack is advantageously employed as a key to keep the sleeve from turning in the tube 11 which is fixed to the frame or carriage member 7, for which purpose the rack is located in a slot 23 in the tube.

A pinion 24 meshes with the rack, this pinion being on a horizontal shaft 25 which is journaled in bearings 26 on the tube 11. The said shaft projects beyond one of the bearings and terminates in a head 27.

A hand-wheel 28 is connected with the projecting part of the shaft 26 for the purpose of turning this shaft to raise or lower the tracer in the vertical bearing 11. Preferably, however, the hand-wheel is capable of being shifted lengthwise of the shaft, while remaining connected therewith in respect to rotation. For this purpose a cross-pin 29 is fixed in the shaft, its ends occupying longitudinal slots 30 in the hub 31 of the hand-wheel.

The inner end of the hub 31 is formed with a crown of clutch teeth 32 adapted to engage with a stationary crown of teeth 33 fixed to the part 11. When the hand-wheel is pulled out against the head 27, this being the position shown in Fig. 5, the hand-wheel can be turned in either direction, to raise or lower the tracer. In this condition, the tracer is also free to float vertically with respect to the frame as the tracer moves over a drawing or template on which it rests when the machine is in operation.

When the tracer has been lifted, the hand-wheel is pushed in as shown in Fig. 3, thereby engaging the holding clutch 32, 33, with the result that the tracer is supported on the frame in its elevated position, clear of anything beneath. The tracer does not have to be raised to one definite height for this purpose, since the teeth of the clutch will engage at practically any position of turning of the shaft 26 and pinion 24.

The clutch which has been described and the shiftable handle or hand-wheel constitute a very desirable form of device for sustaining the tracer in a lifted condition, but other forms of device associated with a lifting handle connected by gearing with the tracer, so that the tracer can be lifted and left supported, or disengaged from the holding device and lowered, by one-hand operation, are within the purview of the invention.

I claim:

1. In a machine of the character described, having a frame universally movable in a plane, a tracer comprising the combination of a member freely movable perpendicularly in said frame, a rack on said member serving as a key to keep said member from turning, a member swiveled in said perpendicularly movable member and movable perpendicularly therewith, rolling means carried by said swiveled member, a shaft passing through said swiveled member for driving said rolling means, a pinion meshing with said rack, a handle for operating said pinion to lift said tracer, and a clutch for sustaining said tracer, said clutch being adapted to remain either in or out.

2. In a welding or cutting machine having a frame supported for universal movement in a plane, the combination of a power driven tracer connected with the frame for floating vertical movement with respect to the frame; a handle and mechanism operated thereby for elevating and lowering the tracer with respect to the frame; and locking means operated by the handle for holding the tracer in elevated position.

3. In a welding or cutting machine having a frame supported for universal movement in a plane, the combination of a power driven tracer connected with the frame for floating vertical movement with respect to the frame; gearing for elevating and lowering the tracer on the frame; a hand wheel for operating the gearing, the hand wheel being connected with said gearing for shifting movement with respect to a part of said gearing; and locking means for holding the tracer in elevated position when the hand wheel is shifted in one direction.

4. In a welding or cutting machine having a frame supported for universal movement in a plane, the combination of a power driven tracer freely movable perpendicularly in the frame; a rotatable shaft carried by the frame; gearing connecting the shaft and tracer; a handle on the shaft for operating the shaft and gearing to move the tracer vertically with respect to the frame, the handle being shiftable longitudinally on the shaft; and locking means, operated by shifting the handle in one direction, for holding the gearing against operation and the tracer in elevated position.

EUGENE L. RAGONNET.